United States Patent [19]

Cheng

[11] Patent Number: 5,986,638
[45] Date of Patent: Nov. 16, 1999

[54] APPARATUS AND METHOD FOR SYNCHRONOUSLY SELECTING ICONS IN FLYWHEEL CONTROLLED COLOR COMPUTER MONITOR

[75] Inventor: Kuei-Pi Cheng, Taipei, Taiwan

[73] Assignee: MAG Technology Co., Ltd., Taipei, Taiwan

[21] Appl. No.: 08/794,483

[22] Filed: Feb. 4, 1997

[51] Int. Cl.[6] .................................................. H03M 11/00
[52] U.S. Cl. ...................... 345/145; 345/146; 345/184; 345/348
[58] Field of Search ................................. 345/352, 353, 345/145, 146, 184, 326, 348, 349

[56] References Cited

U.S. PATENT DOCUMENTS

| | | | |
|---|---|---|---|
| 4,644,337 | 2/1987 | Shank et al. ........................... | 345/184 |
| 5,280,275 | 1/1994 | Kaplan .................................... | 345/157 |
| 5,546,106 | 8/1996 | Wealgers ................................. | 345/184 |
| 5,592,195 | 1/1997 | Misono et al. .......................... | 345/146 |
| 5,596,699 | 1/1997 | Driskell ................................... | 345/352 |
| 5,627,531 | 5/1997 | Posso et al. ............................. | 341/22 |
| 5,689,667 | 11/1997 | Kurtenbach ............................ | 345/352 |
| 5,701,424 | 12/1997 | Atkinson ................................. | 345/353 |
| 5,706,448 | 1/1998 | Blades ..................................... | 345/326 |

*Primary Examiner*—Amare Mengistu
*Assistant Examiner*—Vincent E. Kovalick

[57] ABSTRACT

An apparatus and method for synchronously selecting icons in a flywheel controlled color computer monitor is disclosed, in which the icons representing the monitor display parameters to be adjusted and the function to be executed are arranged into a close circle which defines a circular path to be followed by the screen cursor so that the movement of the screen cursor is substantially in synchronization with the rotational motion of the flywheel control. Thus a more user friendly environment is provided in adjusting the monitor.

1 Claim, 5 Drawing Sheets

APPARATUS AND METHOD FOR SYNCHRONOUSLY SELECTING ICONS IN FLYWHEEL CONTROLLED COLOR COMPUTER MONITOR

FIELD OF THE INVENTION

The present invention relates generally to an apparatus and method for synchronously selecting icons in a flywheel controlled color computer monitor and in particular to a circular arrangement of the icon menu on the monitor screen so as to have the movement of the cursor on the circular icon menu substantially synchronous with the rotation of the flywheel.

BACKGROUND OF THE INVENTION

Using a flywheel control to replace all the monitor adjusting knobs of a computer monitor is known in the art. An on-screen display integrated circuit (OSD IC) is used to display icons of the monitor display parameters that are user adjustable in controlling the monitor. A bit generator is provided as an interface between the user and the monitor to move the screen cursor to a desired icon for performing the desired adjustment. This simplifies the adjustment of the monitor and also provides better aesthetics of the monitor for less knobs are used.

A disadvantage of such a flywheel controlled monitor is that the icons are arranged into a straight row so that the user has to move the cursor in a rectilinear fashion in order to position the cursor at the desired icon. However, the flywheel is moved in rotational fashion so that they are not matched with each other. This causes certain trouble in adjusting the monitor.

Thus, it is desirable to provide an apparatus and method to overcome the non-matching problem between the rotation of the flywheel control and the rectilinear movement of the screen cursor.

SUMMARY OF THE INVENTION

The principal object of the present invention is to provide an apparatus and method for synchronously selecting icons in a flywheel controlled color computer monitor in which the icons representing the monitor display parameters to be adjusted and the function to be executed are arranged into a close circle which defines a circular path to be followed by the screen cursor so that the movement of the screen cursor is substantially in synchronization with the rotational motion of the flywheel control. Thus a more user friendly environment is provided in adjusting the monitor.

BRIEF DESCRIPTION OF THE DRAWINGS

The present invention will be better understood from the following description of a preferred embodiment thereof, with reference to the attached drawings, wherein.

DETAILED DESCRIPTION OF THE PREFERRED EMBODIMENT

Figure 1:
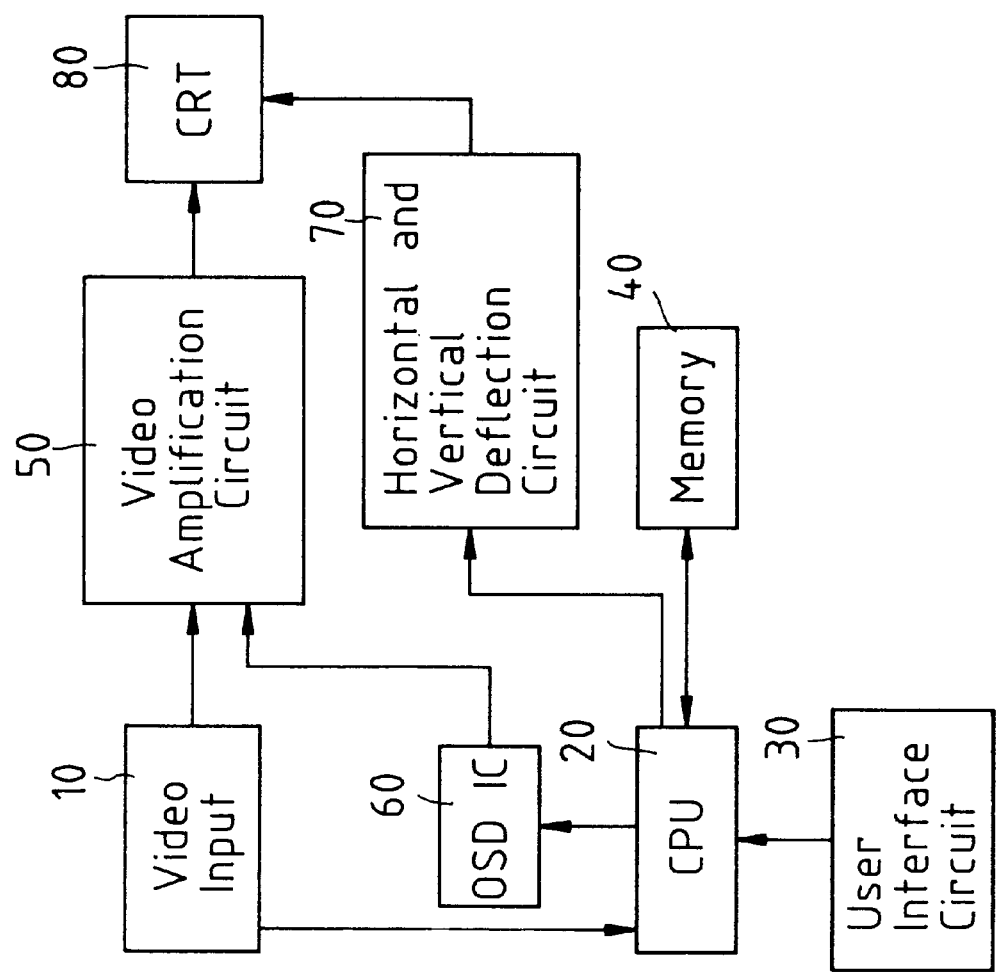
FIG. 1 is a block diagram showing the circuit in accordance with a preferred embodiment of the present invention.

With reference to the drawings and in particular to FIG. 1, which shows a block diagram of the electric circuit in accordance with a preferred embodiment of the present invention, the circuit comprises a video input 10, a microprocessor based controller comprising a central processing unit (CPU) 20, a user interface circuit 30, a memory 40, a video amplification circuit 50, an on-screen display integrated circuit (OSD IC) 60, a horizontal and vertical deflection circuit 70 and a cathode ray tube (CRT) 80.

In the operation of a computer, a computer interface, such as a VGA card (not shown), that is installed inside the computer generates R, G and B color signals and a horizontal synchronous signal (H-SYNC) and a vertical synchronous signal (V-SYNC) which are transmitted to the CPU 20 via the video input 10. These signals are then detected and transmitted to the video amplification circuit 50 by the CPU 20. Since most of the color monitors currently available are multi-sync color monitors, it has to adapt the micro-controller to preserve the video display parameters, including video mode, resolution and video display size, in the memory 40 and to readily modify these parameters and to display the adjustment of the parameters on the CRT 80 by means of icons provided by the OSD IC 60. The CPU 20 detects in what mode the VGA card is and the video mode so detected will be compared with the video mode stored in the memory 40, and to receive the control signal from a flywheel control, including the rotation direction and speed of the flywheel control. The result of comparison and the control signal so received will be used to perform adjustment and to control the OSD IC 60 and the horizontal and vertical deflection circuit 70 to make adjustment on the CRT 80.

Figure 2:
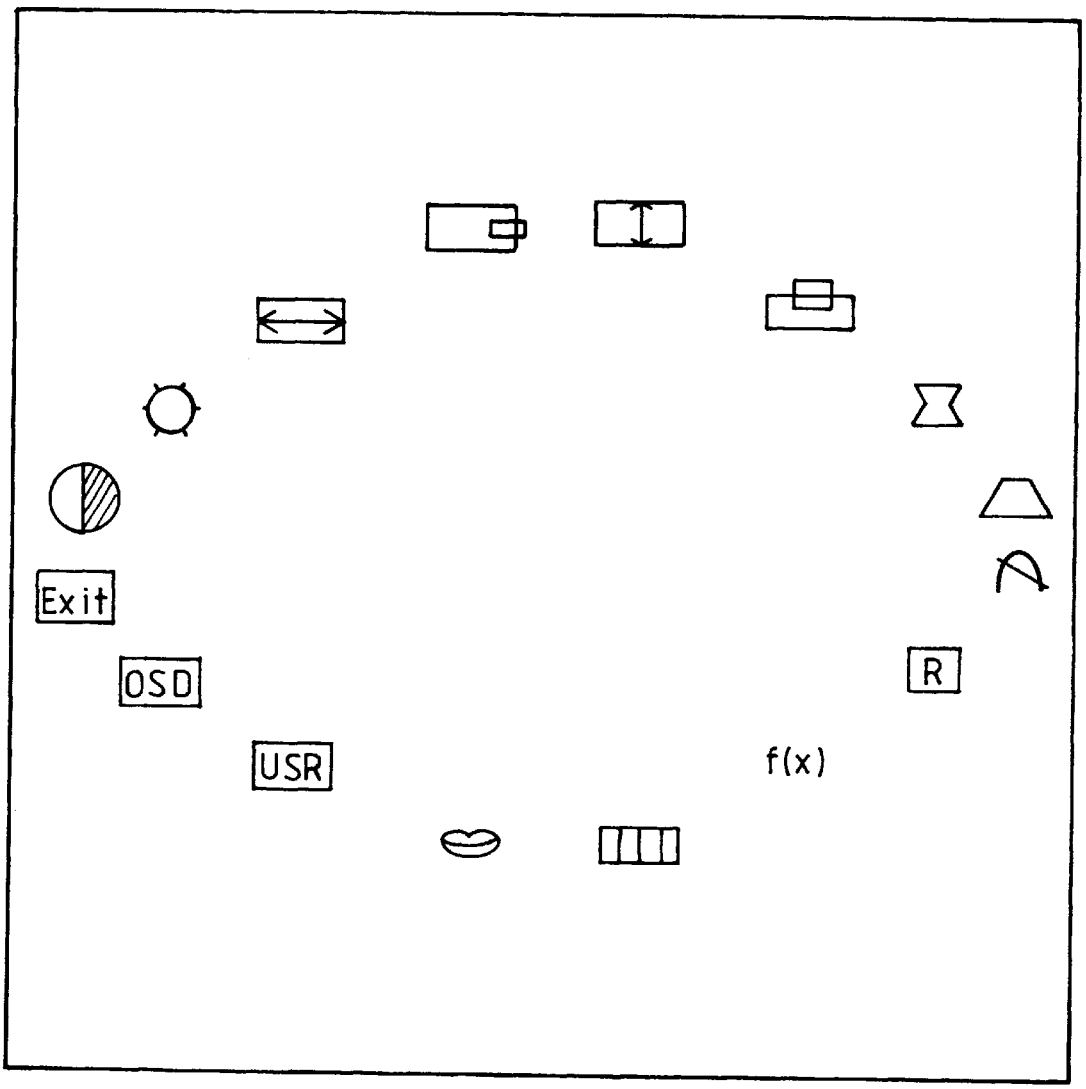
FIG. 2 schematically shows an example of the circular arrangement of the icons on the monitor screen in accordance with the present invention.

FIG. 2 is a schematic view showing an example of a user selection menu comprising a number of icons indicating various monitor display parameters arranged in a circle on a monitor screen to be selected by the user. The icons are roughly divided into two groups of which one is for adjustment of the monitor, including contrast, brightness, geometry related parameters, such as horizontal size, horizontal position, vertical size and vertical position, pincushion and trapezoid which are arranged on the upper half of the circle and the other is for function execution, including degauss, recall geometry, advanced function, color manager, language, user mode, on-screen display (OSD) manager and exit which are arranged on the lower half of the circle. All the icons are arranged in a circular path along which a screen cursor is movable under the control of the flywheel. The icon at which the cursor stops is the one that the user chooses to adjust or execute. The circular arrangement allows a user to move the cursor in synchronization with the rotation of the flywheel by the user. In other words, when the user rotates the flywheel in the clockwise direction, the cursor moves clockwise along the circular path and when the user rotates the flywheel in the counterclockwise direction, the cursor moves counterclockwise. Further, the circular arrangement of the icons also allows the user to move the cursor in a cyclic manner along the circular path, thus making the selection of the icons easier and more user friendly.

Figure 3:
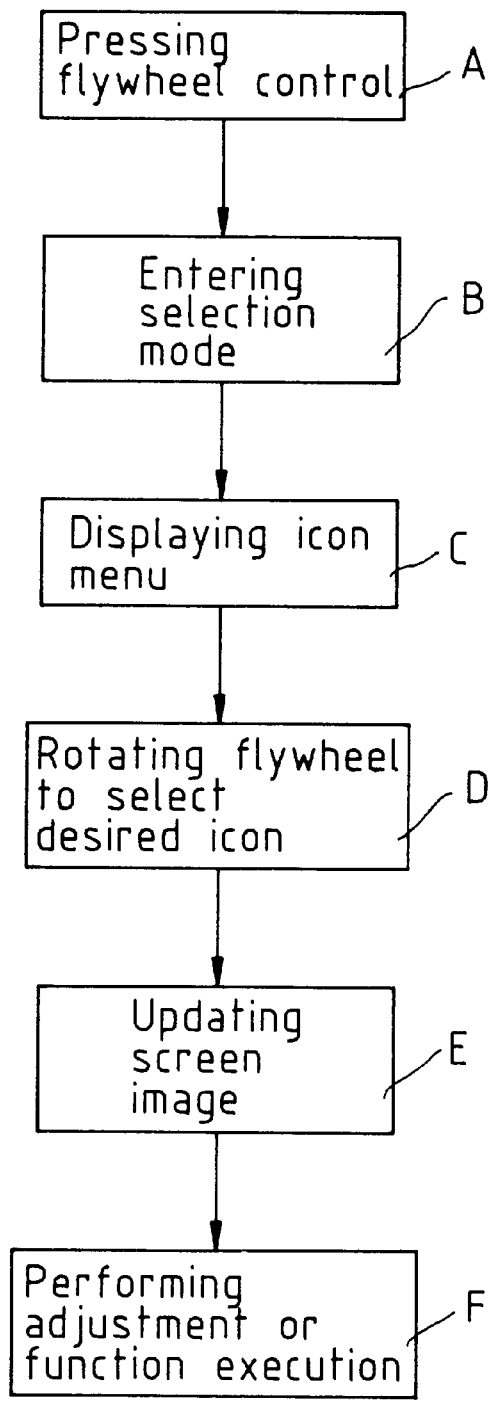
FIG. 3 is a flow chart showing the procedure of the selection mode of the monitor in accordance with the present invention.

As shown in FIG. 3, which shows a flow chart of a selection mode which allows a user to select one of the icons to be adjusted or executed in accordance with the present invention, when the user intends to adjust the monitor screen or to execute certain functions, the user presses the flywheel control and the CPU 20 is signaled thereby through the user interface circuit 30. The CPU 20, once signalled, transmits an icon menu which is constituted by the icons mentioned above to the OSD IC 60 and displays the icon menu on the CRT 80 so that a screen image as shown in FIG. 2 may be observed by the user on the screen. The user may now turn the flywheel control in a desired direction and the CPU 20, in response thereto, modifies and updates the screen image through the OSD IC 60, including updating the position of the screen cursor and the description text of the icon at which the cursor is currently located so as to notify the user of the current situation.

In summary, the procedure of such an operation may comprise the following steps:

Step A: User presses the flywheel control of the user interface circuit 30;

Step B: The CPU 20 is signalled by the user interface circuit 30 to enter the selection mode so as to allow the user to do selection;

Step C: The CPU 20 displays the icon menu on the CRT 80 through the OSD IC 60;

Step D: User rotates the flywheel to select a desired icon from the icon menu;

Step E: The CPU 20 updates the screen image in accordance with the rotation of the flywheel control through the OSD IC 60;

Step F: Performing an adjustment operation of the selected item or executing the selected function.

Figure 4:
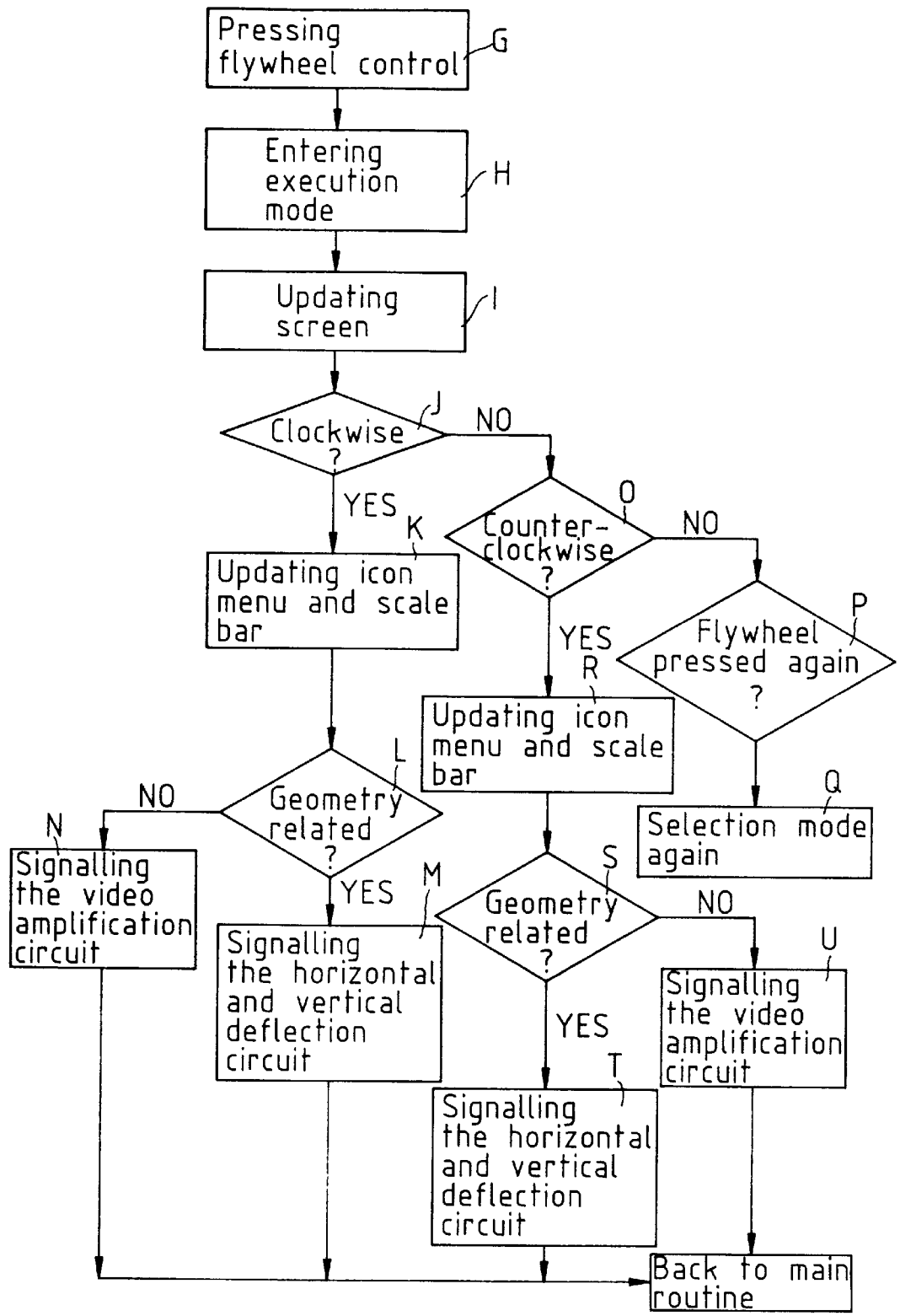
FIG. 4 is a flow chart showing the procedure of adjusting the monitor.

FIG. 4 shows a flow chart of the adjustment operation of the selected monitor display parameter made in step F indicated above. As the user moves the cursor by means of the flywheel control to the desired icon and presses the flywheel control to signal the CPU 20, the CPU 20 enters the execution mode and updates the screen image through OSD IC 60, which includes changing the color of the cursor to notify the user that the current status is in the execution mode and displaying a scale bar related to the parameter of the selected icon. The user may now turn the flywheel in the desired direction to increase or decrease the value of the item shown on the scale bar. The CPU 20 receives the signal from the flywheel control and updates the scale bar in accordance with the signal from the flywheel control. For example if the selected parameter is one of the geometry related parameters, such as horizontal size, horizontal position, vertical size or vertical position, then the CPU 20, after being signalled of the rotation of the flywheel control, sends signal to the horizontal and vertical deflection circuit 70 to make a desired adjustment of the CRT 80. If the selected item is not geometry related, then the CPU 20 sends signal to the video amplification circuit 50 to adjust the display of the CRT 80 in accordance with the signal.

In summary, the procedure may comprise the following steps:

Step G: User presses the flywheel control at the selected icon of the icon menu;

Step H: The CPU 20 is signalled to enter the execution mode by the activation of the flywheel control;

Step I: The CPU 20 sends signal to the OSD IC 60 to update the screen;

Step J: Checks if the user turns the flywheel control clockwise and if it is clockwise, then the procedure goes to step K otherwise the procedure goes to step O;

Step K: The CPU 20 updates the screen image of the menu and sends signal to the OSD IC 60 to update scale bar so as to increase of the adjustment amount of the scale bar;

Step L: Check if the selected item is geometry related and if it is, then the procedure goes to step M, otherwise the procedure goes to step N;

Step M: The CPU 20 transmits a signal of increasing the selected adjustment amount to the horizontal and vertical deflection circuit 70 to have the CRT 80 showing the increase adjustment of the selected item accordingly and then the procedure goes back to main routine;

Step N: The CPU 20 transmits a signal of increasing the selected adjustment amount to the video amplification circuit 50 to have the screen image showing the increase adjustment accordingly and then the procedure goes back to main routine;

Step O: Check if the user turns the flywheel control counterclockwise and if it is, the procedure goes to step R otherwise the procedure goes to step P;

Step P: Check if the user presses the flywheel control again and if it is, the procedure goes to step Q, otherwise the procedure goes back to main routine;

Step Q: Re-start the selection mode and then the procedure goes back to main routine;

Step R: The CPU 20 updates the screen image of the menu and sends signal to the OSD IC 60 to update the scale bar so as to decrease of the adjustment amount of the scale bar;

Step S: Check if the selected item is geometry related and if it is, then the procedure goes to step T. otherwise the procedure goes to step U;

Step T: The CPU 20 transmits a signal of decreasing the selected adjustment amount to the horizontal and vertical deflection circuit 70 to have the CRT 80 showing the decrease adjustment of the selected item accordingly and then the procedure goes back to main routine; and Step U: The CPU 20 transmits a signal of decreasing the selected adjustment amount to the video amplification circuit 50 to have the screen image showing the decrease adjustment accordingly and then the procedure goes back to main routine.

Figure 5:
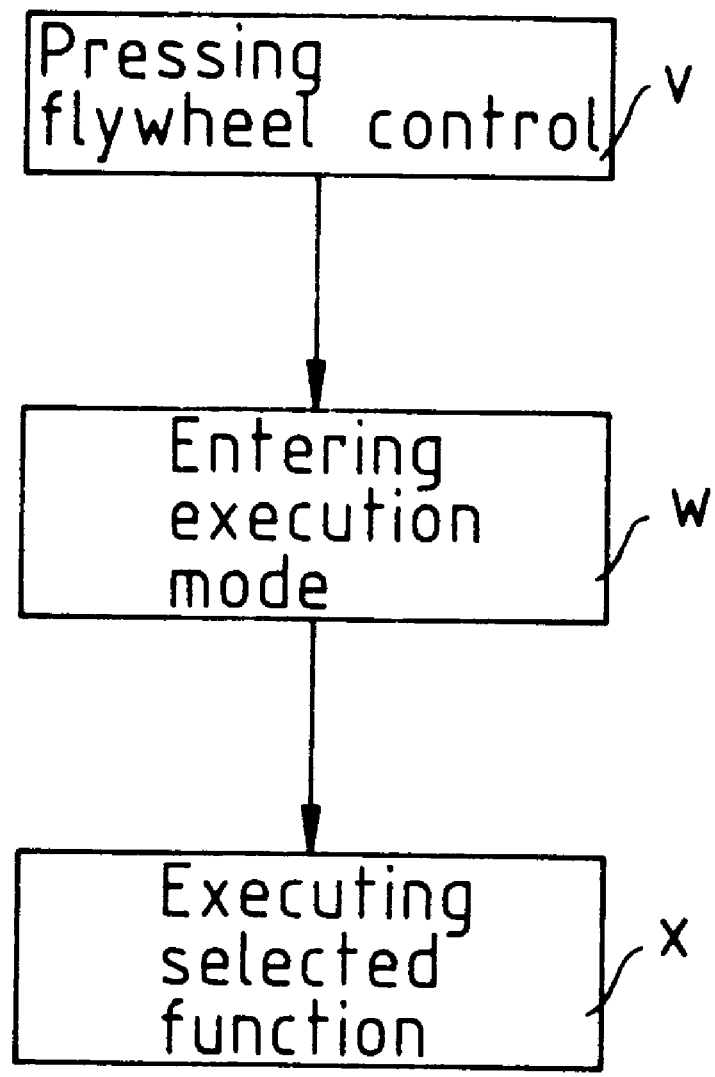
FIG. 5 is a flow chart showing the procedure of executing a function on the monitor.

FIG. 5 shows an exemplary flow chart of the procedure of executing a function indicated by the icon selected, which shows the steps when the user selects one of the icons located on the lower half of the menu shown in FIG. 2. When the user moves the cursor to the desired icon by means of the flywheel control and presses the flywheel control, the CPU 20 is signalled to enter the execution mode and executes the function indicated by the icon. As shown in FIG. 5, the procedure may comprises the following steps:

Step V: User presses the flywheel control at the selected icon of the icon menu;

Step W: The CPU 20 is signalled to enter the execution mode by the activation of the flywheel control; and Step X: The CPU 20 executes the function indicated by the selected icon and acts accordingly.

As discussed above, the apparatus and method in accordance with the present invention not only uses a single flywheel control to replace the conventional design in which a plurality of different knobs are used to perform different adjustment, but also provides a more user-friendly, circular arrangement of the icons on the screen. This allows the user to move the screen cursor in synchronization with the flywheel control so that when the flywheel control is rotated clockwise, the screen cursor moves clockwise and when the flywheel control is rotated counterclockwise, the screen cursor moves counterclockwise. This provides a more user friendly environment to adjust the monitor.

Although an example of the preferred apparatus and method has been described to illustrate the present invention, it is apparent that changes and modifications in the specific embodiment can be carried out without departing from the scope of the invention which is intended to be limited only by the appended claims.

What is claimed is:

1. A method for selecting video display parameters and adjusting the video display of a color computer monitor having a flywheel control, comprising the steps of:

displaying a cursor and a plurality of icons indicating video display parameters for adjustment, said icons being arranged substantially in a circular formation on the screen of said computer monitor;

moving said cursor along said circular formation substantially in synchronization with the rotation of said flywheel control and controlling the position of said cursor by the rotation direction and speed of said flywheel control;

stopping at a desired icon and selecting the desired icon; and adjusting a video display parameter associated with the selected desired icon by executing a method comprising the steps of:

(a) pressing said flywheel control at the selected desired icon for signaling a central processing unit to enter an execution mode and activate said flywheel control for the execution mode;

(b) using said central processing unit to send a signal to an on-screen display integrated circuit for updating the video display of said computer monitor;

(c) checking if said flywheel control is rotated in a first direction and executing step (d) if it is, otherwise executing step (h);

(d) using said central processing unit to update the video display of said computer monitor and display a scale bar indicating a change of the adjusted video display parameter corresponding to a change in the first direction;

(e) checking if the adjusted video display parameter is related to the geometry of the video display of said computer monitor and executing step (f) if it is, otherwise executing step (g);

(f) using said central processing unit to transmit a change signal to a horizontal and vertical deflection circuit to modify the video display of said computer monitor corresponding to the change in the first direction, and returning to step (c);

(g) using said central processing unit to transmit a change signal to a video amplification circuit to modify the video display of said computer monitor corresponding to the change in the first direction, and returning to step (c);

(h) checking if said flywheel control is rotated in a second direction and executing step (k) if it is, otherwise executing step (i);

(i) checking if said flywheel control is pressed again and executing step (0) if it is, otherwise returning to step (c);

(j) exiting current execution mode and re-starting a selection mode;

(k) using said central processing unit to update the video display of said computer monitor and display a scale bar indicating a change of the adjusted video display parameter corresponding to a change in the second direction;

(l) checking if the adjusted video display parameter is related to the geometry of the video display of said computer monitor and executing step (m) if it is, otherwise executing step (n);

(m) using said central processing unit to transmit a change signal to a horizontal and vertical deflection circuit to modify the video display of said computer monitor corresponding to the change in the second direction, and returning to step (c);

(n) using said central processing unit to transmit a change signal to a video amplification circuit to modify the video display of said computer monitor corresponding to the change in the second direction; and returning to step (c).

* * * * *